US008655390B2

(12) United States Patent
Karmarkar et al.

(10) Patent No.: US 8,655,390 B2
(45) Date of Patent: *Feb. 18, 2014

(54) DYNAMIC CONTEXT-DATA REPRESENTATION

(75) Inventors: Amit Vishram Karmarkar, Palo Alto, CA (US); Richard Ross Peters, Mill Valley, CA (US)

(73) Assignee: Buckyball Mobile Inc, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/595,891

(22) Filed: Aug. 27, 2012

(65) Prior Publication Data

US 2013/0172021 A1 Jul. 4, 2013

Related U.S. Application Data

(63) Continuation of application No. 12/782,572, filed on May 18, 2010, now Pat. No. 8,275,399, which is a continuation-in-part of application No. 12/770,626, filed on Apr. 29, 2010, which is a continuation-in-part of application No. 12/422,313, filed on Apr. 13, 2009, and a continuation-in-part of application No. 11/519,600, filed on Sep. 11, 2006, now Pat. No. 7,551,935, which is a continuation-in-part of application No. 11/231,575, filed on Sep. 21, 2005, now Pat. No. 7,580,719.

(60) Provisional application No. 61/161,763, filed on Mar. 19, 2009.

(51) Int. Cl.
*H04W 4/02* (2009.01)
*H04W 64/00* (2009.01)

(52) U.S. Cl.
USPC ............... 455/457; 455/456.2; 455/456.3; 455/412.1

(58) Field of Classification Search
USPC ............... 455/456.2, 456.3, 412.1, 457
See application file for complete search history.

(56) References Cited

U.S. PATENT DOCUMENTS

| 7,422,934 | B2 * | 9/2008 | Yamazaki et al. | 438/151 |
|---|---|---|---|---|
| 7,603,112 | B2 * | 10/2009 | Huomo et al. | 455/414.2 |
| 8,180,379 | B2 * | 5/2012 | Forstall et al. | 455/456.6 |
| 2002/0122055 | A1 * | 9/2002 | Parupudi et al. | 345/737 |
| 2002/0173295 | A1 * | 11/2002 | Nykanen et al. | 455/414 |
| 2002/0191002 | A1 * | 12/2002 | Friedrich et al. | 345/632 |
| 2005/0028194 | A1 * | 2/2005 | Elenbaas et al. | 725/32 |
| 2005/0174470 | A1 * | 8/2005 | Yamasaki | 348/345 |
| 2007/0281745 | A1 * | 12/2007 | Parkulo et al. | 455/557 |
| 2009/0030774 | A1 * | 1/2009 | Rothschild et al. | 705/10 |
| 2010/0299326 | A1 * | 11/2010 | Germaise | 707/728 |
| 2011/0282919 | A1 * | 11/2011 | Sweeney et al. | 707/805 |
| 2013/0127980 | A1 * | 5/2013 | Haddick et al. | 348/14.08 |

* cited by examiner

*Primary Examiner* — Lester Kincaid
*Assistant Examiner* — Diego Herrera

(57) ABSTRACT

Disclosed are a system, method, and article of manufacture of a dynamic context-data representation. A first context data can be received. The first context data can be obtained from a user-worn sensor. The user-worn sensor can measure a user attribute. A second context data can be received. The second context data can be obtained from another sensor. The second context data can measure a user location. A graphical representation of the first context data and the second context data can be created. The graphical representation can be modified according to a change of a value of the first context data as a function of time or a change of a value of the second context data as a function of time.

18 Claims, 12 Drawing Sheets

Home        Commuting

Montezuma Cafe

Mom's House                Work
             Gym

A11 Burritos    University Library

Michelle's Home

— 800

FIGURE 8

DYNAMIC CONTEXT-DATA REPRESENTATION

CLAIM OF PRIORITY

This application claims is a continuation of patent application Ser. No. 12/782,572 filed May 18, 2010 now U.S. Pat. No. 8,275,399 which is a continuation-in-part of and claims priority to Ser. No. 12/770,626 filed on Apr. 29, 2010 which is a continuation-in-part of and claims priority to patent application Ser. No. 12/422,313 filed on Apr. 13, 2009 which claims priority from provisional application 61/161,763 filed on Mar. 19, 2009. Patent application Ser. No. 12/422,313 is a continuation-in-part of patent application Ser. No. 11/519,600 filed Sep. 11, 2006, issued as U.S. Pat. No. 7,551,935. Patent application Ser. No. 11/519,600 is a continuation-in-part of patent application Ser. No. 11/231,575 filed Sep. 21, 2005, issued as U.S. Pat. No. 7,580,719. Patent application Ser. No. 12/782,572 is hereby incorporated by reference.

FIELD OF TECHNOLOGY

This disclosure relates generally to a data communication system, and, more particularly, to a system, a method and an article of manufacture of a dynamic context-data representation.

BACKGROUND

Mobile devices may include several types of sensors. Sensors can be used to acquire information about a contextual attribute of a mobile device. For example, a mobile device can include a global positioning system (GPS) module used to determine a geolocation of the mobile device.

Many types of sensors have decreased in size. As a result, the number of sensors capable of being included in a mobile device has increased. Consequently, the amount of context data available has also increased. Given the increase in available context data, the organization and presentation of context data may also become more complex. User experience can suffer if the context data is not presented in a user-friendly format.

SUMMARY

A system, method, and article of manufacture of a dynamic context-data representation are disclosed. In one aspect, a first context data is received. The first context data is obtained from a user-worn sensor. The user-worn sensor measures a user attribute. A second context data is received. The second context data is obtained from another sensor. The second context data measures a user location. A graphical representation of the first context data and the second context data is created. The graphical representation is modified according to a change of a value of the first context data as a function of time or a change of a value of the second context data as a function of time.

In another aspect, a first context data of a first environmental attribute is obtained from a mobile device. A second context data of a second environmental attribute is obtained from the mobile device. A tag cloud including a first component that describes the first context data and a second component that describes the second context data is generated. A display attribute of the first component is modified according to the first context data as a function of time. A display attribute of the second component is modified according to the second context data as a function of time.

In yet another aspect, a first context data of a first environmental attribute is obtained. A second context data of a second environmental attribute is obtained. An icon comprising a first component that describes the first context data and a second component that describes the second context data is generated. A display attribute of the first component is modified according to the first context data as a function of time. A display attribute of the second component is modified according to the second context data as a function of time.

BRIEF DESCRIPTION OF THE DRAWINGS

The embodiments of this invention are illustrated by way of example and not limitation in the figures of the accompanying drawings, in which like references indicate similar elements and in which:

FIG. 8 illustrates an exemplary context-data tag cloud, according some embodiments.

Other features of the present embodiments will be apparent from the accompanying drawings and from the detailed description that follows.

DETAILED DESCRIPTION

Disclosed are a system, method, and article of manufacture of a dynamic context-data representation. Although the present embodiments have been described with reference to specific example embodiments, it will be evident that various modifications and changes can be made to these embodiments without departing from the broader spirit and scope of the various claims.

Figure 1:
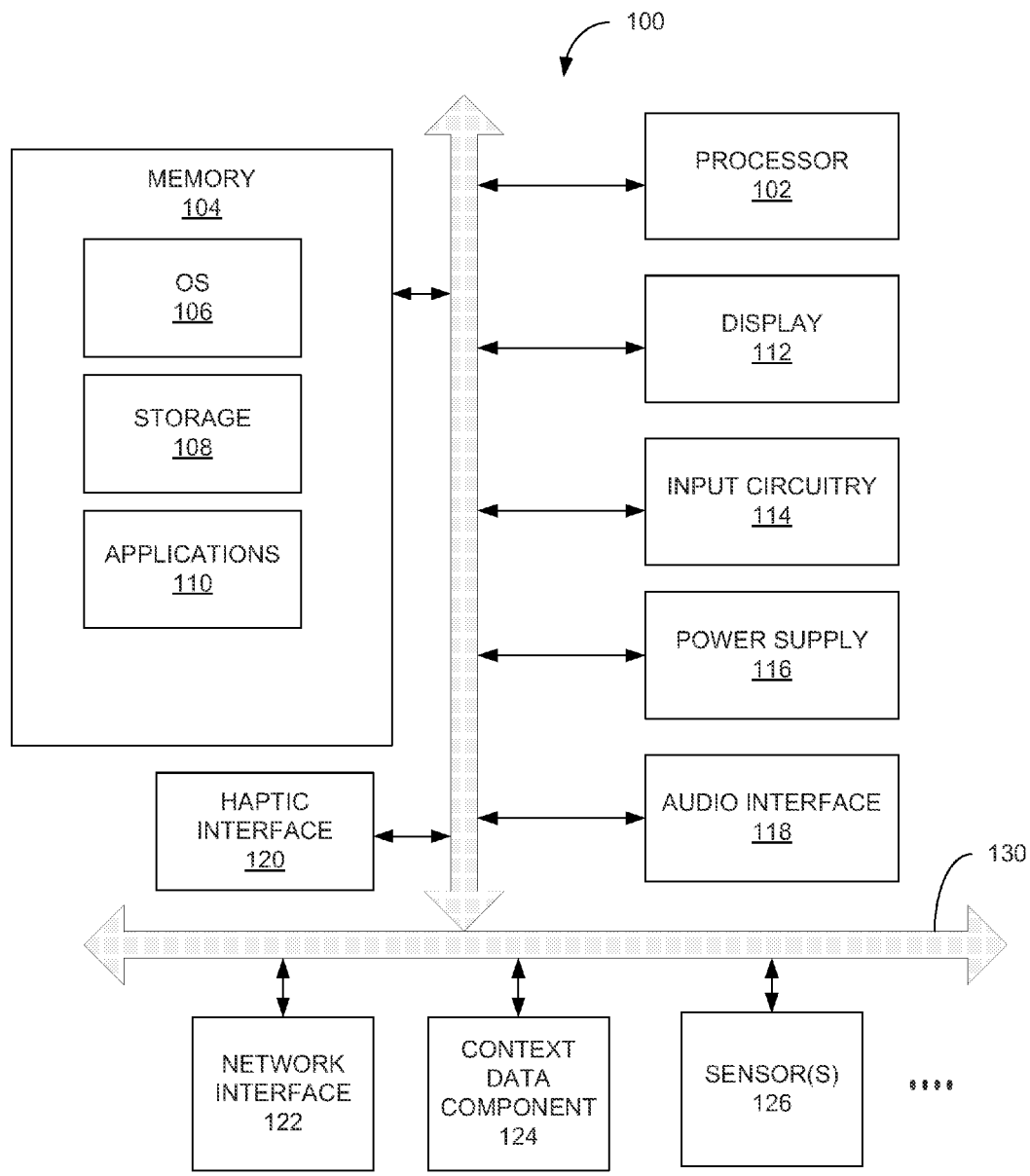
FIG. 1 shows a functional block diagram of an example mobile device, according to one or more embodiments.

FIG. 1 shows a functional block diagram of an example mobile device, such as mobile device 100, according to one or more embodiments. In some embodiments, the mobile device 100 can be a smart-phone system. It should be noted that in some example embodiments, another type of computing device (e.g. a personal computer, a tablet computer, a portable media player, personal digital assistant, body-wearable computing system and/or Wi-Fi mobile platform) can perform the same functionalities as the mobile device 100. Therefore, FIG. 1 should not be interpreted as being exclusive only to mobile devices with regards to other example embodiments. The mobile device 100 includes a processor 102. The processor 102 can execute software programs resident in the memory 104. The memory 104 can includes both volatile memory (e.g., RAM) and non-volatile memory (e.g., ROM, Flash Memory, or the like). An operating system 106 can be resident in the memory 104. The operating system 106 can execute on the processor 102 and manage the activities and the sharing of the resources of the mobile device 100. Example operating systems include, inter alia, a Mac OS X, a Unix-like OS, a Symbian OS, a BlackBerry OS, an Android OS, and a Windows Mobile OS. In some embodiments, the user input device 114 can be a push button numeric dialing pad (such as on a typical telephone). In some embodiments, the user input device can be a multi-key keyboard (such as a conventional keyboard or a keyboard scaled for optimized "thumbing"). In some embodiments, the scaled keyboard can be virtualized and displayed on a touchscreen of the mobile device 100. In some embodiments, user input can be accomplished by orienting the mobile device in certain patterns and/or by voice-input commands. The display 112 can be a liquid crystal display, or any other type of display commonly used in mobile devices. Display 112 can include system display programs such as a graphical user interface (GUI). In some embodiments, display 112 can be touch-sensitive (e.g. a capacitive touchscreen), and would then include an input device. One or more application programs 110 are loaded into memory 104 and run on the operating system 106. Example application programs 110 include, inter alia, messaging applications such as short message service (SMS), multimedia messaging service (MMS), enhanced messaging service (EMS), IP Multimedia Subsystem (IMS) applications, voice messaging applications and the like. Other applications can include applications for acquiring data files via the communications network 300 such as a web browser, email applications, instant messaging (IM) applications and/or a FTP client.

Figure 5:
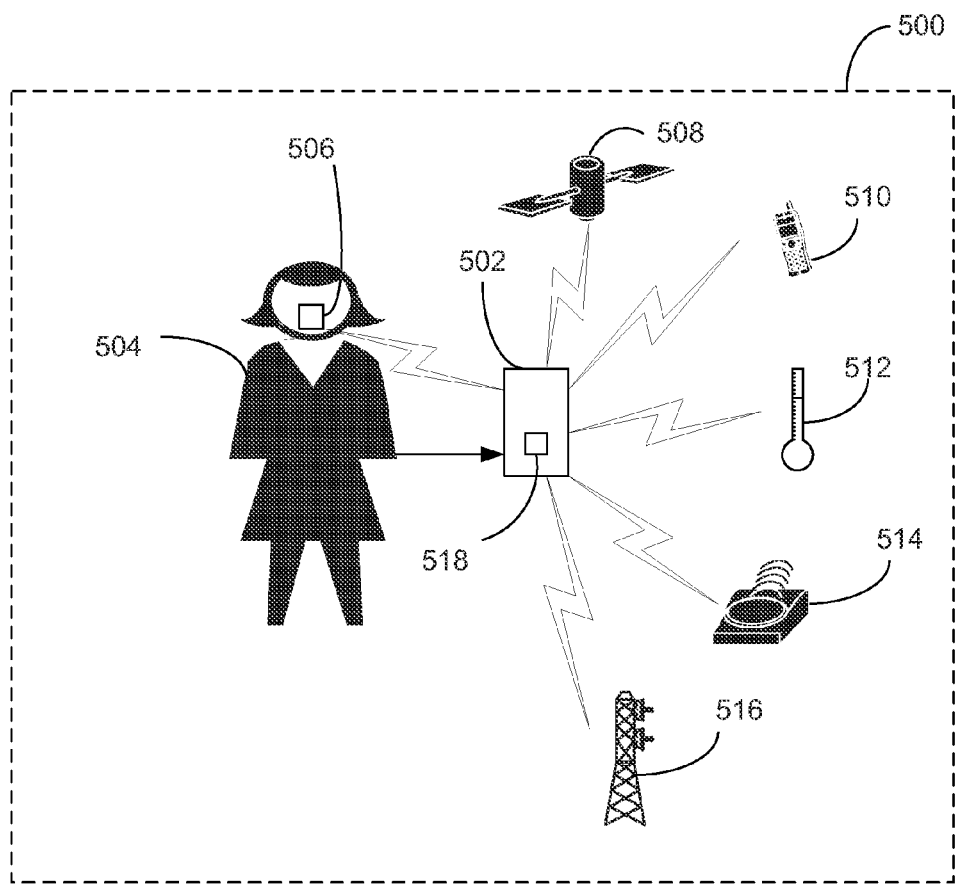
FIG. 5 illustrates a block diagram of an exemplary set of an example context-data sources, according to some embodiments.

The context-data component 124 can manage the acquisition of context data from at least one sensor 126. Although specific examples of types of data that can be utilized as context data are described infra, it is to be understood that the context-data component 124 can obtain, receive and/or access any type of information that can subsequently be employed to establish the context of the mobile device 100. More particularly, the context-data component 124 can be employed to generate, receive and/or obtain context data (e.g. a contextual attribute of the mobile device 100). As shown in FIG. 5 infra, in some embodiments, the context-data component 124 can also interact with a user to obtain information to establish the context (e.g. query a user for input). In some embodiments, context-data component 124 can coordinate the acquisition of context-data from multiple sensor(s) 126 and/or data sources (such as a third-party data source) to establish a single context data. For example, context-data component 124 can utilize context data from Wi-Fi tags, GPS devices and other geolocation systems to generate a single geolocation context data. In this example, context-data component 124 can periodically determine quality of service (QoS) of a particular context-data source. Context-data component 124 can then utilize sources with the highest QoS values. Additionally, context-data component 124 can modulate the power provided to various sensor(s) 126 in order to scale power use in the mobile device 100 and/or improve a QoS value of the particular sensor obtaining the best QoS value. In some embodiments, context-data component 124 can parse, encode and format data from sensors into a computer-readable form. In some embodiments, context-data component 124 can include application program interfaces (APIs) for interfacing with and acquiring context data from virtual sensors and/or external data sources.

The mobile device 100 also includes storage 108 within the memory 104. In some embodiments, the storage 108 can be a non-volatile form of computer memory. The storage 108 can be used to store persistent information which should not be lost if the mobile device 100 is powered down. In some embodiments, the storage 108 can store information such as historical context data.

The applications 110 can use and store information in the storage 108, such as e-mail or other messages used by an e-mail application, contact information used by a PIM, appointment information used by a scheduling program, documents used by a word processing program, instant messaging information used by an instant messaging program, context data, context data metrics, voice message use by a voice messaging system, text message used by a text messaging system and the like. The mobile device 100 has a power supply 116, which can be implemented as one or more batteries. The mobile device 100 is also shown with an audio interface 118 and a haptic interface 120. The audio interface 118 can provide audible signals to and receive audible signals from the user. For example, the audio interface 118 can be communicatively coupled to a speaker for providing audible output and to a microphone for receiving audible input. The haptic interface 120 can be used to provide haptic signals to a user. The mobile device 100 can also include a network interface layer 122 that performs the function of transmitting and receiving radio frequency communications (e.g. using a radio interface). The network interface layer 122 facilitates wireless connectivity between the mobile device 100 and the outside world, via a communications carrier or a service provider. Transmissions to and from the network interface layer 122 are conducted under control of the operating system 106. Communications received by the network interface layer 122 can be disseminated to application programs 110 via the operating system 106, and vice versa.

The mobile device 100 further includes at least one sensor 126. In some embodiments, the sensor 126 can be a device that measures, detects or senses an attribute of the mobile device's environment and then converts the attribute into a signal that can be read by a computer (e.g. context-data component 124). Example sensors include, inter alia, global positioning system receivers, accelerometers, inclinometers, position sensors, barometers, WiFi sensors, RFID sensors, gyroscopes, pressure sensor, pressure gauges, time pressure gauges, torque sensors, ohmmeters, thermometers, infrared sensors, microphones, image sensors (e.g. digital cameras), biosensors (e.g. photometric biosensors, electrochemical biosensors), capacitance sensors, radio antennas and/or capacitance probes. It should be noted that the other sensor devices other than those listed can also be utilized to sense context data. In some embodiments, a sensor(s) 126 can be virtualized and reside in memory 104. In some embodiments, additional information about context data and/or virtual context data can also be acquired from a computing system such as the server cloud, an external sensor, an external database (e.g. stores a video game environment), and the like. The bus 130 can be a subsystem that transfers data between computer components.

In some embodiments, certain devices may not include some of the components described in connection with FIG. 1. Such devices include electronic bracelets, electronic tags, implantable devices, computer goggles, other body-wearable computers, smart cards, smart devices and the like. System 100 can be modified according to the parameters of such devices.

Figure 2:
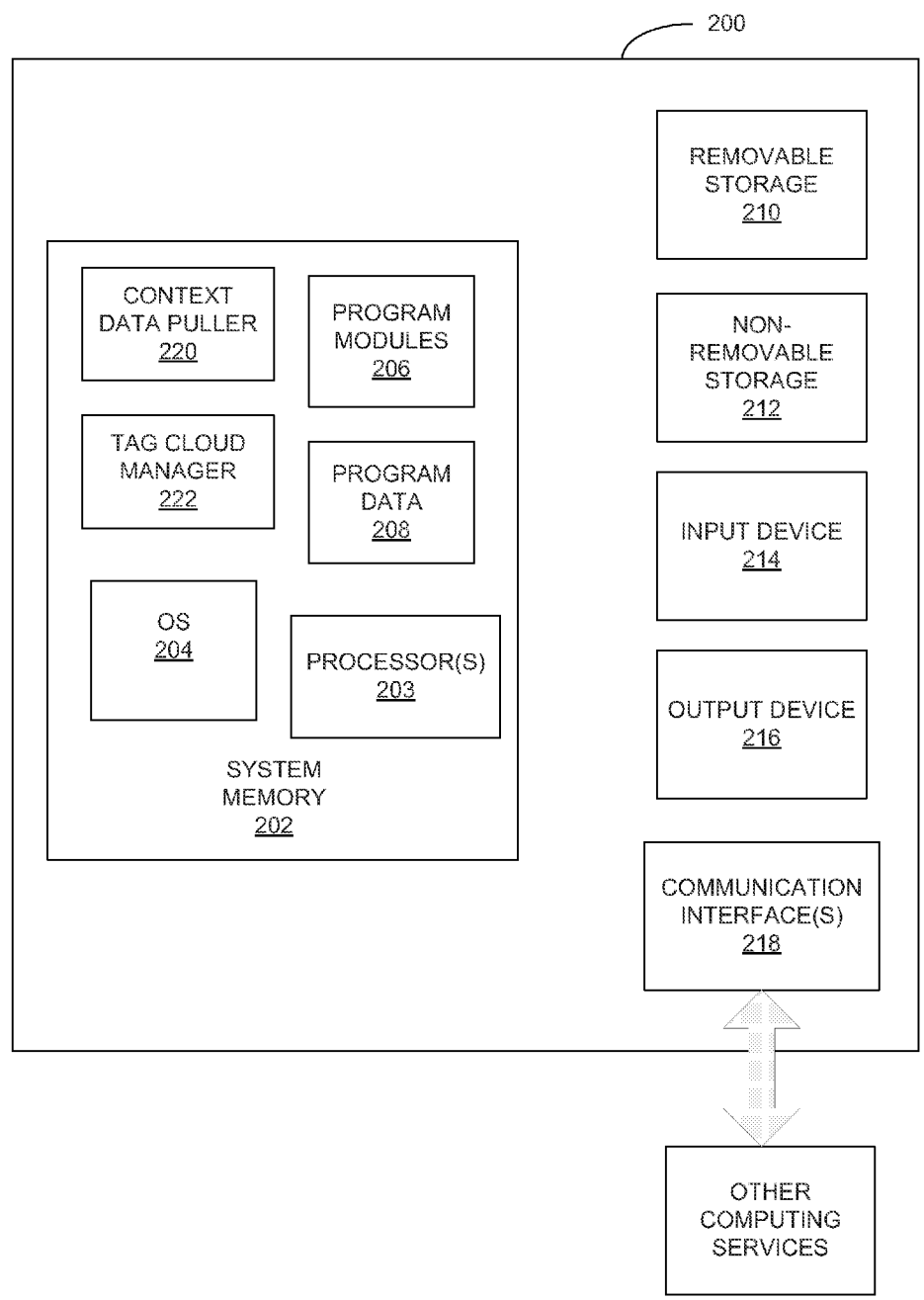
FIG. 2 shows a block diagram of a computer, such as a context-data server operable to execute the disclosed architecture of generating and managing a dynamic context-data tag cloud, according to one or more embodiments.

FIG. 2 shows a block diagram of a computer, such as the context-data server 200, operable to execute the disclosed architecture of generating and managing a dynamic context-data tag cloud. In a basic configuration, the context-data server 200 typically includes at least one processing unit 203 and system memory 202. Depending on the exact configuration and type of computing device, system memory 202 can be volatile (such as RAM), non-volatile (such as ROM, flash memory, etc.) or some combination of the two. The system memory 202 generally includes an operating system 204, one or more program modules 206, and other program data 208. In some embodiments, system memory 202 can also include several of the functionalities of the mobile device 100 (e.g. a context-data component (not shown)) as program modules. Thus, the context-data server 200 can provide a resource to scale the processing power and battery resources of the mobile device 100. Additionally, the context-data server 200 can utilize a separate context-data store (such as data storage 306 of FIG. 3). In some embodiments, separate context-data store (e.g., data store 306) can also be utilized to scale the data storage resources of mobile device 100.

In some embodiments, the context-data server 200 can include a context-data puller 220 and a tag cloud manager 222. Context-data puller 220 can acquire context data. For example, in some embodiments, context-data puller 220 can communicate a request to a mobile device and/or third-party system for context. Context-data puller 220 can store context data in a data store (such as data store 306). Context-data puller 220 can also retrieve historical context data from the data store. Context data puller 220 can interact with a third-party system via an applied program interface (API), to acquire additional information about context data. For example, context data puller 220 can acquire a map from a third-party mapping service.

Tag cloud manager 222 can generate a context-data tag from the context-data. For example, a table can be used to match a context-data tag (e.g. 'Home') with a geolocation context data (e.g. GPS coordinates). In some embodiments, one or more context-data tags can be provided as a context-data tag cloud by the tag cloud manager 222. Tag cloud manager 222 can weigh the context-data tags according to a value of the context data. The weight of a context-data tag can be signified graphically (e.g. font size, font color, graphical metaphor). Tag cloud manager 222 can configure the context-data tag cloud in a format suitable for a mobile device interface (e.g. a webpage interface). Moreover, tag cloud manager 222 can include hyperlinks in the context-data tag cloud. For example, a hyperlink can reference a document such as a webpage with another context-data cloud or additional information about the context data referenced by a context-data tag. In some embodiments, the context-data server 200 can aggregate context-data tags from multiple mobile devices in a single context-data tag cloud.

The context-data server 200 can include additional features or functionalities. For example, the context-data server 200 can also include additional data storage devices (removable and/or non-removable) such as, for example, magnetic disks, optical disks, or tape. Such additional storage is illustrated in FIG. 2 by removable storage 210 and non-removable storage 212. Example, computer storage media can include volatile and nonvolatile, removable and non-removable media implemented in any method or technology for storage of information, such as computer readable instructions, data structures, program modules, or other data. The system memory 202, removable storage 210 and non-removable storage 212 are all examples of computer storage media. Computer storage media includes, but is not limited to, RAM, ROM, EEPROM, flash memory or other memory technology, CDROM, digital versatile disks (DVD) or other optical storage, magnetic cassettes, magnetic tape, firmware, magnetic disk storage or other magnetic storage devices, or any other medium which storage media can be part of the context-data server 200. These computer storage media can include computer-executable instructions for implementing the various embodiments described herein. The context-data server 200 can also have input device(s) 214 such as a keyboard, a mouse, a pen, a voice input device, a gesture-based interface and/or a touch-sensitive input device. Output device(s) 216 such as a display, speakers, printer, etc. can also be included.

The context-data server 200 can also include communication interfaces 218 that allow the device to communicate with other computing devices over a communication network. Communication interfaces 218 are one example of communication media. Communication media can typically be embodied by computer readable instructions, data structures, program modules, or other data in a modulated data signal, such as a carrier wave or other transport mechanism, and includes any information delivery media. The "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. The computer readable media as used herein can include both storage media and communication media according to various example embodiments. In an example embodiment, the context-data server 200 can provide instructions to a mobile device 100 to acquire and analyze certain context-data and then communicate the context-data to the context-data server 200.

Figure 3:
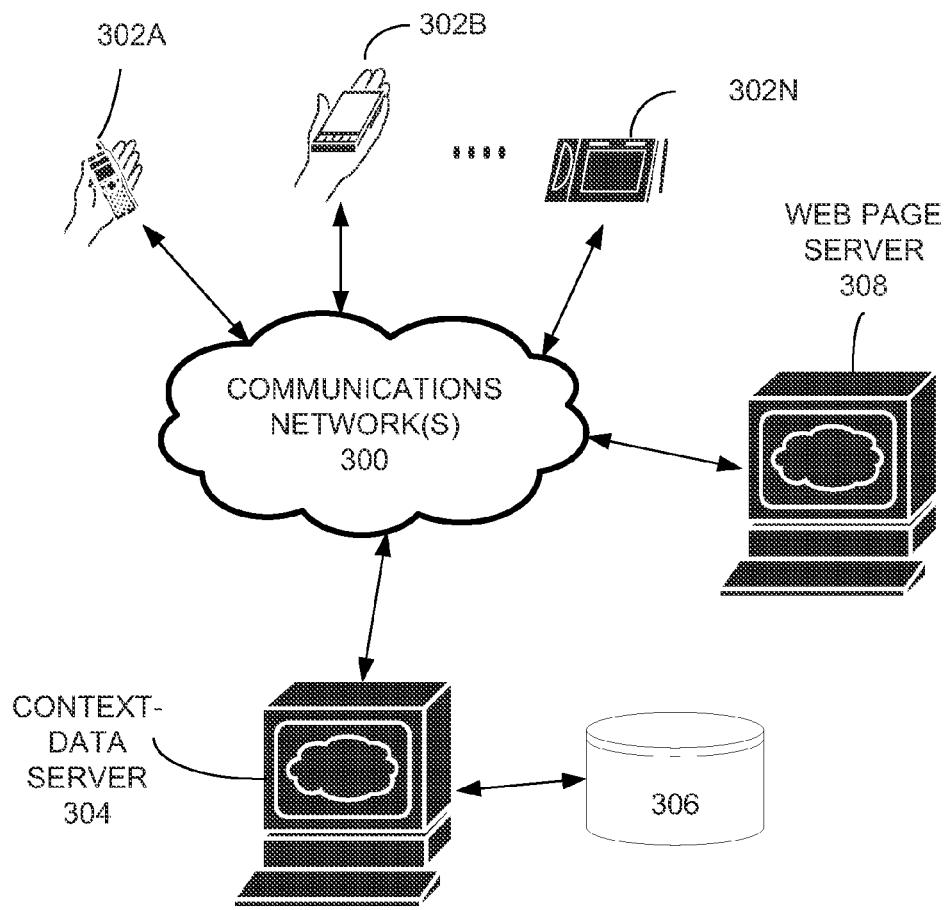
FIG. 3 is a block diagram showing a schematic view of an example system of dynamic context-data tag cloud generation and management, according one or more embodiments.

FIG. 3 is a block diagram showing a schematic view of an example system of dynamic context-data tag cloud generation and management according one or more embodiments. Communication network(s) 300 can include any suitable circuitry, device, system or combination of these (e.g., a wireless communications infrastructure including communications towers and telecommunications servers, an IP network, the Internet, a cellular network, and the like) operative to create a computer network. For example, communication network(s) 300 can provide wireless communications using any suitable short-range or long-range communications protocol. In some embodiments, communication network(s) 300 can support, for example, Wi-Fi (e.g., an 802.11 protocol), Bluetooth™, high frequency systems (e.g., 900 MHz, 2.4 30 GHz, and 5.6 GHz communication systems), infrared, other relatively localized wireless communication protocols, or any combination thereof.

In some embodiments, communication network(s) 300 can support protocols used by wireless and cellular phones and personal email devices. Such protocols can include, for example, GSM, GSM plus EDGE, CDMA, UMTS, quad-band, and other cellular protocols. In another example, a long-range communications protocol can include Wi-Fi and protocols for placing or receiving calls using VOW or LAN. In this way, the systems and devices of FIG. 3 can transfer data between each other as well as with other computing devices (e.g. third party servers and databases) not shown for the purposes of clarity.

Communication network(s) 300 operatively couples the various computer systems of FIG. 3. In some embodiments, mobile devices 302 A-N can include mobile devices (e.g. a smart phone such as the iPhone™, Motorola Droid™, Blackberry™, or Nexus One™) such as the one described in conjunction with FIG. 1 supra. Mobile devices 302 A-N can include smart phone capabilities to access web pages. For example, mobile devices 302 A-N can support a client application that interacts with a server application supported by the context data server 304 and/or the webpage server 308 in order to transmit and receive files.

Mobile devices 302 A-N include context data acquisition and analysis capabilities. Mobile devices 302 A-N can communicate the context data to the context data server 304. Mobile devices 302 A-N can also include at least one application/utility for transmitting and receiving files that include context data. In one example, the context data can be included in the payload of data packets such as an SMS and/or MMS data packet. For example, context data can be communicated to a message service center (such as an SMSC). The message service center can then forward the context data to the context data server 304. The message service center can forward the context data on a periodic basis and/or upon a query from the context data server 304. In another example, the context data can be included in a separate data packet and transmitted to the context data server 304 independently of a message data packet. For example, the context data can be included in an IP data packet and transmitted to the context data server 304 via the communications network(s) 300.

In some embodiments, the context-data server 304 can also be utilized to acquire, determine, rank and associate various context data from multiple mobile device sources. Context-data server 304 can then use the context data to generate and update a context-data tag cloud. In some embodiments, context-data server 304 can communicate the context-data tag cloud content to a webpage server 308. In some embodiments, a mobile device can include a context-data tag cloud application. Context-data server 304 can then communicate the context-data tag cloud content to the mobile device application. Context-data server 304 can utilize context-data store 306 to store data such as historical context data, context data/context-data tag tables, context-data tag tables/icon tables, user information, location information, and the like.

Webpage server 308 can support computer programs that serve, inter alia, context-data tag cloud content on a webpage. For example, the content can be served utilizing a data transfer protocol such HTTP and/or WAP. Thus, in some embodiments, mobile devices 302 A-N can include a web browser to access webpage files hosted by the webpage server 308.

Figure 4:
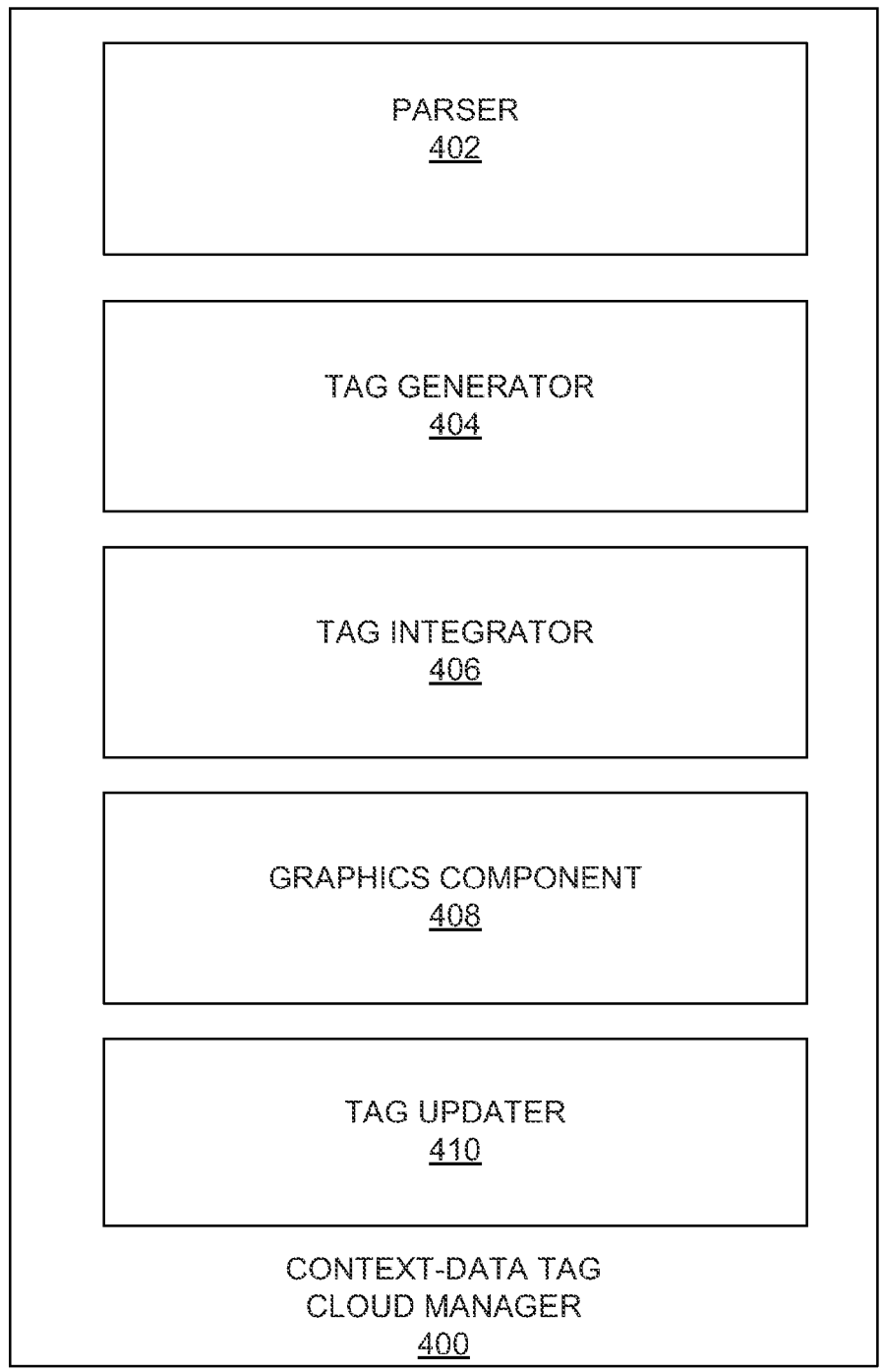
FIG. 4 is a block diagram that illustrates an exemplary context-data tag-cloud manager, according to one or more embodiments.

FIG. 4 is a block diagram that illustrates an exemplary context-data tag-cloud manager 400 according to one or more embodiments. Parser 402 can parse a communication (e.g. context-enriched text message, a context-data message and/or a cellular-network control signal) from a mobile device 302 A-N and/or another server to acquire context data. Tag generator 404 can generate a context-data tag from the context data. For example, in some embodiments, tag generator 404 can utilize a table to match a context-data with a descriptive term, phrase and/or graphical metaphor. In some embodiments, context data can be symbolized as an icon, sinusoidal wave or as a graph of certain context-data values.

Tag integrator 406 can integrate generated context-data tags into a list of other context-data tags. Context-data tags can be listed according to any attributes and/or relationships between attributes of the context data represented by the context-data tags. For example, context-data tags related to geolocation data can be listed in a geolocation tag list. In some embodiments, tag integrator 406 can rank the context-data tags in the list according to a specified parameter. Example parameters include, inter alia, a context data value, quality of the context data, order of occurrence of context data, location of the context data, the relationship of the context data to another context data, frequency of the occurrence of an event represented by the context data, origin of the context data, status of a user associated with the context data and/or any combination thereof. In some embodiments, tag integrator 406 can modify an attribute of a context-data to provide a visual cue of the ranking of the context-data tag in the list. For example, a visual cue (e.g. location in context-data tag cloud, font size, text color, text stylization, graphical metaphor and the like) of the context-data tag can be modified to indicate a value of a ranking parameter. It should be noted that in some embodiments, tag integrator can include non-context-data tag elements (e.g. a text message component, a digital photograph) in a context-data tag cloud.

In some embodiments, a graphical metaphor can be utilized to indicate a ranking (i.e. weighing) of a context-data tag and/or a value of a context data represented by the context-data tag. Graphical metaphors can be used for such purposes as symbolizing a user state, a particular context-data state or a mobile device state. For example, the context-data tag can include a sun icon and a moon icon. The sun icon can be displayed during the period when the user state is awake. The moon icon can be displayed during the period the user state is asleep. User state can be inferred from context data (e.g. ambient lighting, motion of the mobile device, location in a bedroom, and the like). In another example, a context-data tag can represent a mobile device's velocity. The mobile device may be travelling at a high-rate of speed only normally possible in an airplane. The context-data tag can be then be rendered as an airplane icon.

Graphics component 408 can render the tag cloud into an appropriate graphical format (e.g. in a webpage format with a markup language such as XHTML), Tag updater 410 can query an origin of a context data to obtain an updated value of the context data. For example, tag updater 410 can communicate an instruction to mobile device 302A to acquire a new particular context-data value. Mobile device 302A can then utilize an appropriate sensor to acquire the context data. Mobile device 302A can then communicate the context data to context-data tag-cloud manager 400. In some embodiments, context-data tag-cloud manager 400 can include other applications and utilities, such as search engines and the like, that facilitate the functionalities discussed supra.

FIG. 5 illustrates a block diagram of an exemplary set of context-data sources, according to some embodiments. In some embodiments, mobile device 502 can include a set of sensors to detect and capture signals from an example context-data environment 500. Context-data sources can include context data from a user 504 such as a human user. Context data from a user can include biometric data, user movement data, user input and the like. The sensors of mobile device 502 can acquire the context data from physical contact with the user. In some embodiments, context data can be implied from user behavior as well. For example, user voice and/or movement patterns can be analyzed to determine a user state. Additionally, sensors (such as an embedded or worn sensor 506) can be implanted and/or worn by the user 504. Geolocation context-data such as global positioning system (GPS) data can be acquired from GPS satellite 508. Other geolocation context data can be acquired from wireless tag 514, cellular towers 516 and/or other real time locating systems (RIFTS) (not shown) or any combination thereof. Additionally, other mobile device systems 510 can provide context data. For example, mobile device 510 can communicate a control signal that is received by 502. This information can then be used to match mobile device 510 with a particular user. A context-data tag of the user's name can then be generated. Additionally, in some embodiments, the location of mobile device 510 can be determined. For example, bile device 510 can communicate its geolocation data to context-data server 504. In another example, mobile device 510 can periodically transmit a signal that includes certain context data. Other mobile devices such as 502 can then utilize the context data in the signal to generate context-data tags and/or provide additional information (e.g. with a file accessed by a hyperlink in a context-data tag). External sensors 512 (e.g. smart devices) can also provide context data to the mobile device 502. In some embodiments, such external sensors 512 can communicate to the mobile device 502 via a standard for exchanging data over short distances such as Bluetooth™, radio-frequency identification (RFID) and/or near field communication (NFC) and the like. Internal sensors 518 (e.g. an accelerometer) can acquire information regarding the state and/or orientation of the mobile device 502.

Figure 6:
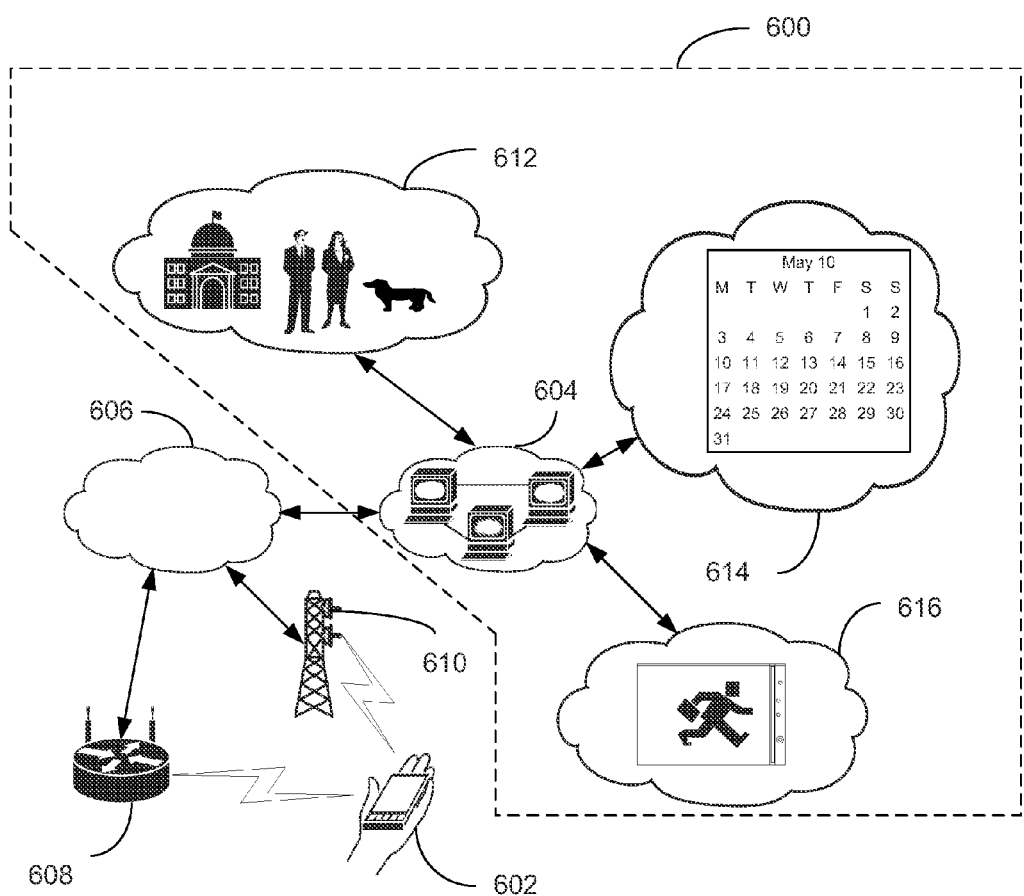
FIG. 6 illustrates a block diagram of an exemplary set of virtual context-data sources, according to some embodiments.

FIG. 6 illustrates a block diagram of another exemplary set of virtual context-data sources, according to some embodiments. In some embodiments, mobile device 602 can include at least one virtual sensor (e.g. a software implementation of a physical sensor 126) to determine attributes virtual context-data sources 600. In some embodiments, a virtual context-data source 600 can include a mobile device's computing environment, the mobile device's data environment, a computer-generated simulation of reality accessed by the mobile device, a computerized-gaming environment, and the like.

In some embodiments, the virtual context-data source can be hosted by a server cloud 604. However, it should be noted that other virtual context-data sources can reside in the memory of other computer systems such as the memory of the mobile device 602. Server cloud 604 can comprise a server layer of a cloud computing system designed for the delivery of cloud computing services. The server cloud 604 can include such systems as multi-core processors, cloud-specific operating systems and the like. Server cloud 604 can communicate data to the mobile device 602 via the communication network 606. Communication network 606 can include both cellular 610 and/or wireless-based 608 networking systems for communicating data to the mobile device 602.

Example virtual context-data sources 612-616 include a virtual world 612 (e.g. Second Life™), user calendar 614 and a computerized-gaming environment 616. In virtual world 612, a user can interact with other users and virtual objects. For example, in some embodiments, a virtual sensor can render attributes of the users (e.g. user avatar attributes), virtual environmental attributes and/or virtual object attributes into virtual context data. Similarly, a virtual sensor can acquire context data from user and environmental (e.g. level of play) attributes of a computerized-gaming environment 616. User calendar 614 can provide user schedule data that can be rendered as virtual context data. In some embodiments, the mobile device 602 can include a combination of virtual sensor and real sensors.

Figure 7:
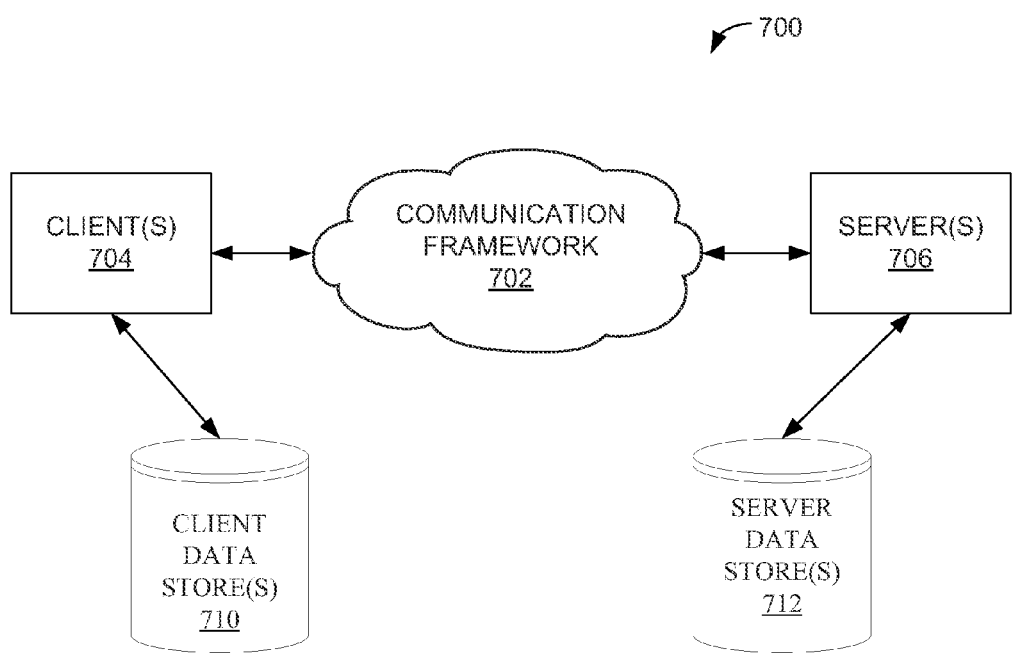
FIG. 7 illustrates a block diagram of an exemplary computing environment, according to some embodiments.
Figure 11:
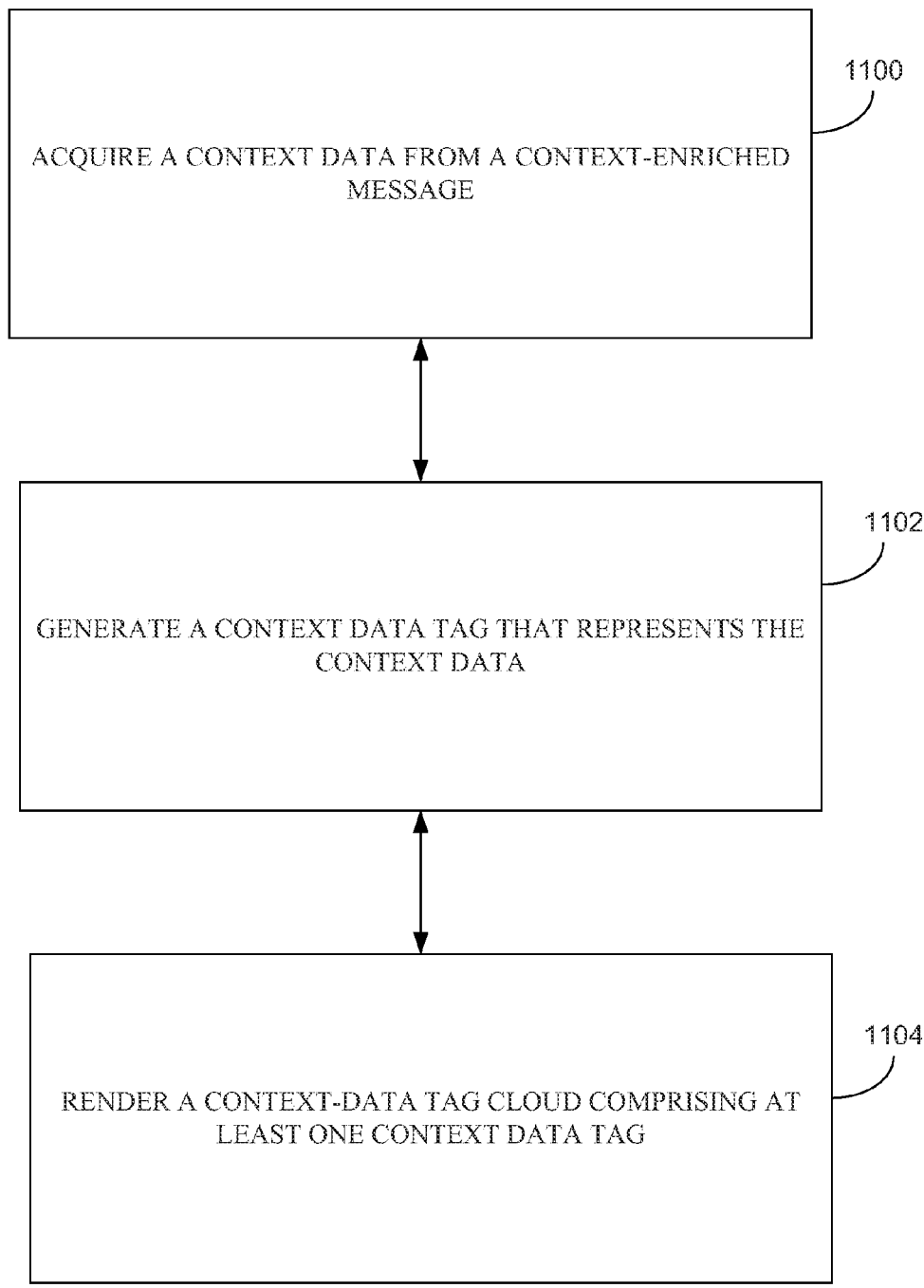
FIG. 11 illustrates a methodology of implementing a context-data tag cloud, according one embodiment.
Figure 12:
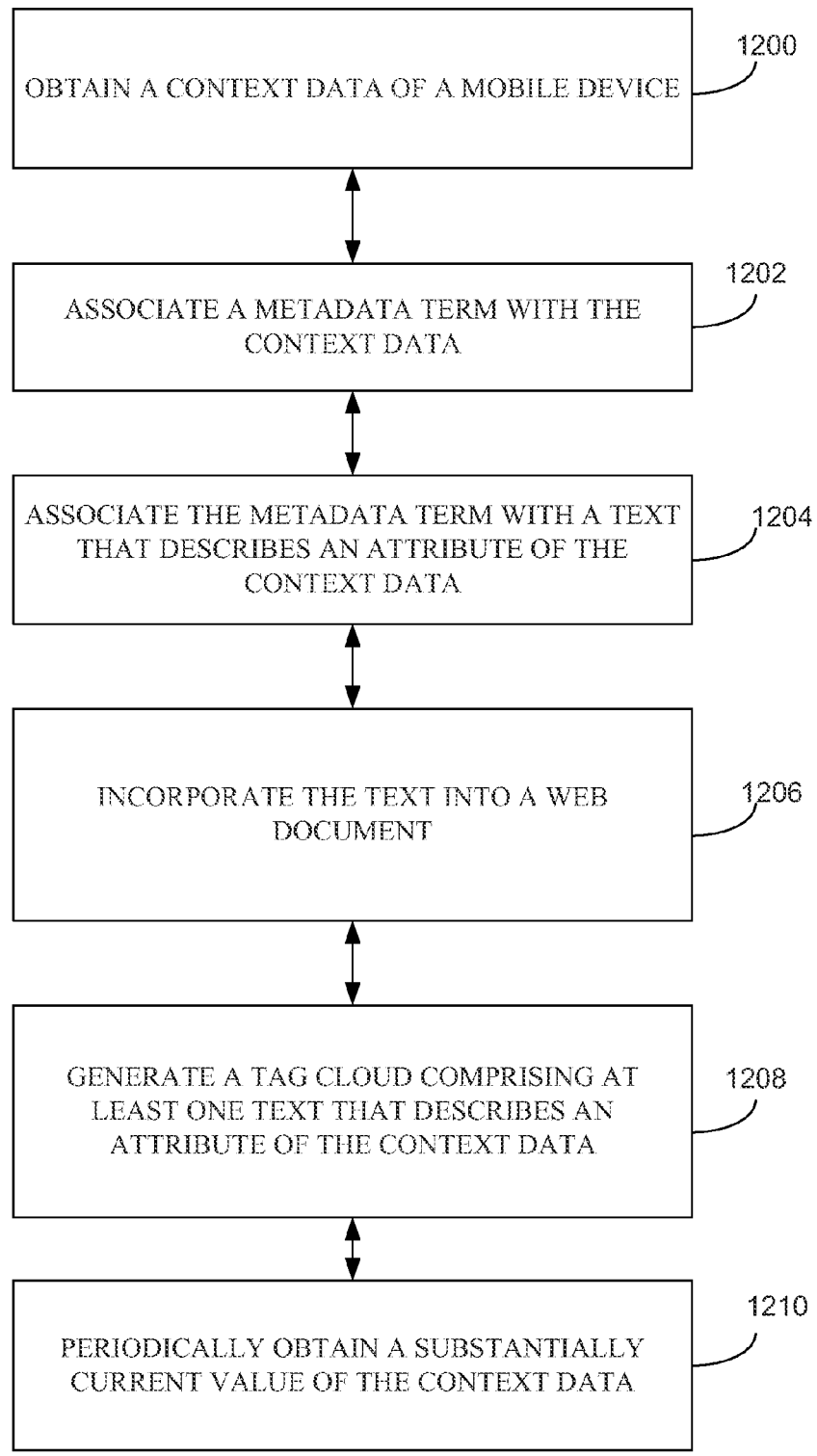
FIG. 12 illustrates a methodology of implementing a context-data tag cloud, according another embodiment.

FIG. 7 illustrates a block diagram of an exemplary computing environment 700 in accordance with the methods and operations described herein such as the operations of FIGS. 11-12. The system 700 includes one or more client(s) 704. The client(s) 704 can be hardware circuitry and/or software applications (e.g., threads, processes, computing devices), that initiates communications with the server(s) 706 according to the client-server communication paradigm. Clients 704 can be implemented in a variety of ways, including as computers, portable digital assistants (PDAs), communication devices (e.g. the mobile device 302 A-N), and the like. The clients are equipped with conventional mechanisms to receive the communication framework 702, such as ports, network cards, receivers, modems, and so on. The client(s) 704 can house cookie(s) and/or associated contextual information to perform the methods and operations of some embodiments.

The system 700 also includes one or more server (s) 706. In some embodiments, the server(s) 706 can also be hardware circuitry and/or software applications threads, processes, computing devices). The server(s) 706 can house threads to perform the methods and operations described by herein, such as the operations of FIGS. 11-12, infra, for example. One possible communication between a client 704 and a server 706 can be in the form of a data packet adapted to be transmitted between two or more computer processes. The data packet can include a cookie and/or associated contextual information, for example. Servers 706 can be implemented in a number of ways, such as a host server at a Website, a dedicated search engine (e.g., that stores information for searching but not the content for search hits), and so forth. The content can be organized and made available to clients 706 in any of a wide variety of conventional manners. The information communicated from the servers 706 may be in any data type (e.g., text, graphics, audio, video, etc.) and cony essentially any type of subject matter. As one particular example, the information may be in the form of mashup applications or web pages pulled to clients 704 from asocial networking website.

The system 700 includes a communication framework 702 communications network 300, the Internet, etc) that can be employed to facilitate communications between the client(s) 704 and the server(s) 706. Communications can be facilitated via a wired (including optical fiber) and/or wireless technology. The client(s) 704 can be operatively connected to one or more client data store(s) 710 that can be employed to store information local to the client(s) 704 (e.g., cookie(s) and/or associated contextual information). Similarly, the server(s) 706 can be operatively connected to one or more server data store(s) 712 that can be employed to store information local to the server(s) 706. It should be noted, that in some embodiments, a particular application can function as a client in one context or operation and as a server in another context or operation.

FIG. 8 illustrates an exemplary context-data tag cloud according one embodiment. Context-data tag cloud 800 can be rendered on a display (e.g. display 112) by a GUI of a mobile device (e.g. mobile devices 302 A-N). In the particular example illustrated by FIG. 8, context-data tag cloud 800 includes context-data tags derived from various geolocation context-data of a mobile device for a specified period. It should be noted that in other example embodiments, any context-data type can be rendered as an element of a context-data tag cloud. Context-data tag clouds can also be heterogeneous and include more than one type of context data. s Typically, the elements of a context-data tag cloud can be configured in a variety of orders including, inter alia, in alphabetical order, in a random order, sorted by weight, in chronological order, clustered semantically so that similar tags will appear, near each other, and/or any combination thereof. In some embodiments, heuristics can be used to configure size, shape, the graphic orientation and/or other attributes of the tag cloud. For example, the elements of context-data tag cloud 800 have been arranged to allow a viewer to determine a most recent activity. Elements appearing nearest to the center of tag cloud indicate more recency of occurrence then elements at the edge of the tag cloud. Thus, the user was at the 'gym' more recently than at 'work'.

Individual context-data tags can be weighted according to a value of the context data represented. For example, the font size, color and/or another visual cue of a context-data tag can be modified to indicate a context-data value. More particularly, context-data tag cloud 800 includes context-data tags weighted by font size. Font size can be equated with such variables as sequence of at a geolocation, frequency of at the geolocation, time located at the geolocation and/or any combination thereof. In the example of context-data tag cloud 800, the context-data tag cloud can indicate a period that the user of the mobile device has spent at each activity by the respective font sizes of each statement. For example, the user has more time commuting than at his mother's home because 'commuting' appears in a larger font size than 'mom's house'. In some embodiments, the font size of the terms can be correlated to a period spent at a particular geolocation. The geolocation can be associated with a particular tag term. In some embodiments, the tag term can be determined by the manual input of the user in a table that associates geolocation coordinates with tag terms. In some embodiments, a functionality of the context-data server 304 can algorithmically determine a tag term from by analysis of such resources as a database of the user text messages, social networking friend profiles and the like. Such databases can be stored in data store 308. For example, user may have texted a friend, "I'm at my mother's home". Context-data server 306 can have parsed and analyzed the text message in order to have determined a geolocation to associate with synonyms of the term 'mother' such as 'mom'. In some embodiments, user's mother may have provided her geolocation and relationship on a social networking website. Context-data server 306 can then utilized this information to associate the tag term "Mom's house" with a particular geolocation. In some embodiments, user's geolocation tag term can be inferred from a set of context data. For example, the term "commuting" can be in inferred from a start and endpoint of movement of the user's mobile device over a period culturally allocated to travelling to or from work. In some embodiments, context-data server 306 can mine user's social networking status updates and/or microblog posts to determine an appropriate tag term.

In some embodiments, context-data server 306 can utilize one or more pattern recognition algorithms to determine the meaning of a word or phrase and/or provide an appropriate tag term. Suitable types of pattern recognition algorithms can include neural networks, support vector machines, decision trees, K-nearest neighbor, Bayesian networks, Monte Carlo methods, bootstrapping methods, boosting methods, or any combination thereof.

In some embodiments, geolocation can be performed by associating a geographic location with an Internet Protocol (IP) address, MAC address, RFID, hardware embedded article/production number, embedded software number (such as UUID, Exif/IPTC/XMP or modern stenography), invoice, Wi-Fi connection location, or device OPS coordinates, or even user-disclosed information.

Figure 9:
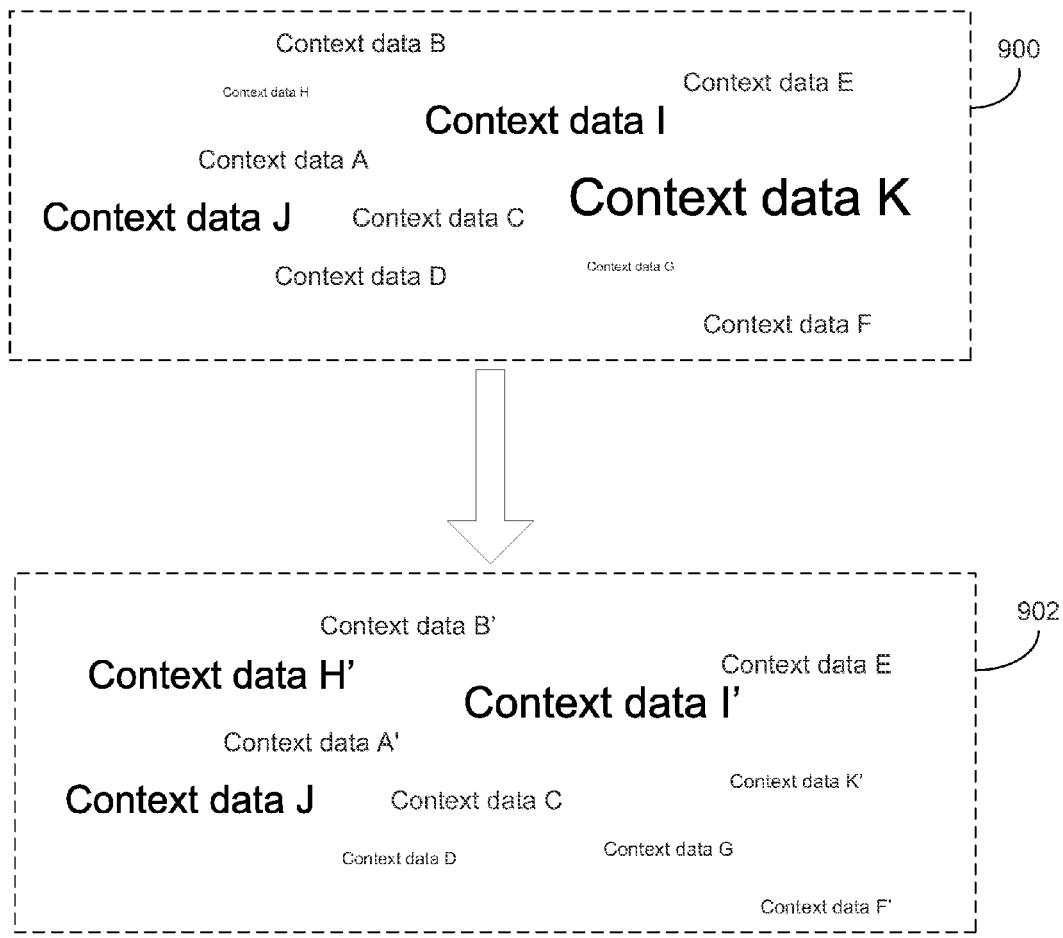
FIG. 9 illustrates a dynamic update of a context-data tag cloud, according to one or more embodiments.

FIG. 9 illustrates a dynamic update of a context-data tag cloud, according to one or more embodiments. Context-data tag cloud 900 includes a variety of context-data tags representing various types of context data acquired from a mobile device. The various context-data tags are weights and arranged according to a set of parameters. Context-data tag cloud 902 shows the same context-data tag cloud updated (e.g. by the context-data tag manager 400) after a change in several context-data values acquired by the mobile device. For example, context-data values can change as a function of such variables as time, environmental factors and/or location of the mobile device. The context-data tags associated with the changed context-data values are designated as prime (i.e. with a '). The context-data tags of context-data tag cloud 902 have been re-weighted in accordance with the change in the corresponding context-data values. It should be noted that some of the context-data tags have remained constant indicating that the context-data server 304 has not received an updated context-value from a mobile device.

Figure 10:
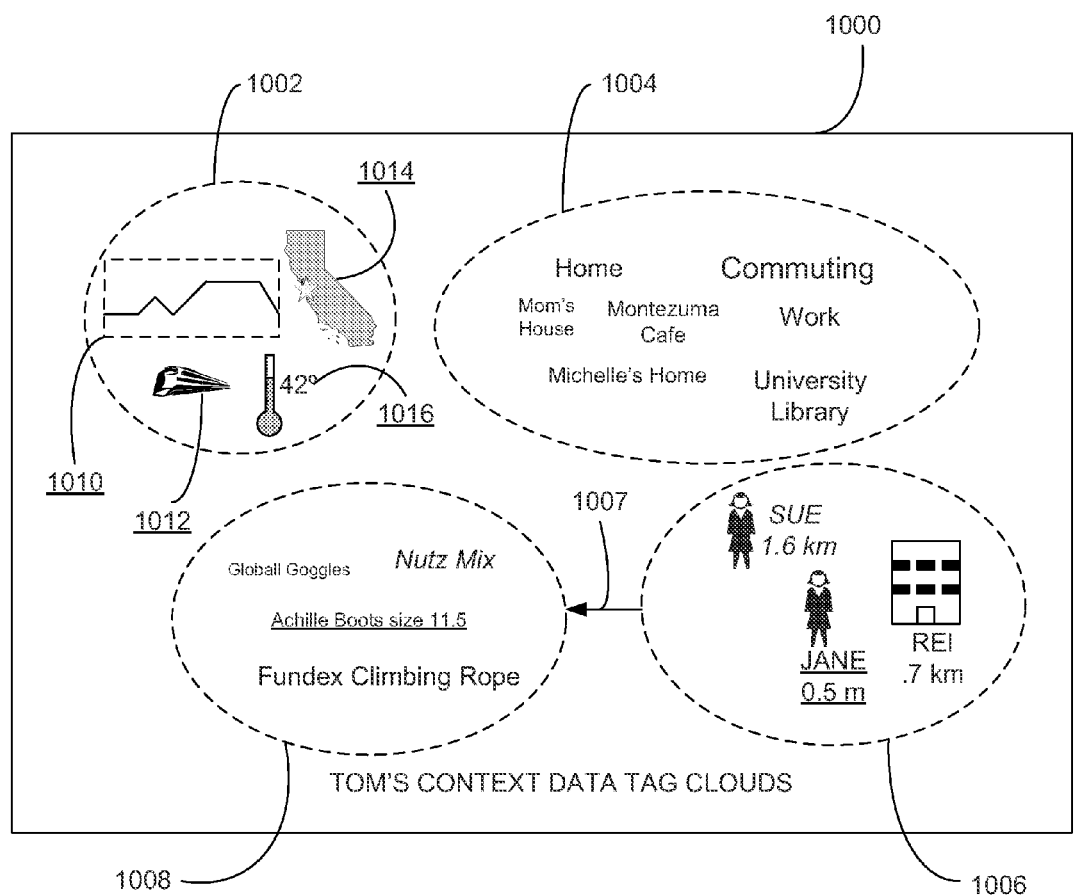
FIG. 10 illustrates a screenshot showing a display interface of a serialized context-data tag cloud window, according to one or more embodiments.

FIG. 10 illustrates a screenshot showing a display interface of a context-data tag cloud window, according to one or more embodiments. The desktop user interface 1000 (also referred to herein as "desktop UI") can be used to present one or more context-data tag clouds associated with a user (e.g. 'Tom'). In some embodiments, desktop UI 1000 can also be used to present one or more context-data tag clouds associated with a location, entity and/or a mobile device. It should be noted that in some embodiments, a context-data server (or, in some embodiments, another functionality) can also use context data from multiple context-data sources (e.g. mobile devices) to generate context-data tag clouds.

Referring to FIG. 10, the desktop UI 1000 can be a user interface provided by an operating system. In some embodiments, the UI 1000 can present the interface used with at least one control (e.g. a touchscreen control, virtual buttons, hyperlinks in context-data tags, menu button—not shown) to navigate and modify the various elements of UI 1000. For example, context-data tag cloud graphics can be moved with drag and drop operations. In some embodiments, an individual context-data tag graphic can be touched to initiate an update of the context-data value. Once an update context-data value has been obtained (assuming processing and network latency), the context-data tag graphic can then be modified to provide a visual cue corresponding to the new context-data value. In some embodiments, context-data tag clouds (and/or elements of a context-data tag cloud) can be integrated into another context-data tag cloud (e.g. with a drag and drop operation).

In some embodiments, a context-data tag icon generator (not shown) can be provided. The context-data tag icon generator can be activated by an operation such as dragging and dropping a text-based context-data tag onto a control button. The context-data tag icon generator can then modify the text-based context-data tag into an icon-based context-data tag. For example, a table that matches icons with terms and/or phrases can be utilized to determine an appropriate icon.

As shown, UI 1000 includes graphical representations of context-data tag clouds 1002-1008. Context-data tag cloud 1002 includes context-data tags 1010-1016. Context-data tag 1010 includes a graph depicting a history of the velocity vector of the user's mobile device. Such a graph can be generated using geolocation and/or accelerometer context data, for example. Context-data tag 1012 depicts an icon of a train to indicate that the mobile device (and vicariously the user) is presently riding on a train. The means of transportation can be implied from such context-data as the geolocation context-data sequence (i.e. approximates a known train-track route), user's status update, a Wi-Fi tag id associated with the train service, and the like. Context-data tag 1014 includes an icon of the mobile device's present location rendered as a star within a 2-D map. Context-data tag 1014 can be generated using a mashup application that includes a third-party mapping application and the mobile device's geolocation data. Context-data tag 1016 depicts a temperature context-data (both text and an icon) obtained from a digital thermometer sensor integrated with the mobile device. Context-data tag cloud 1004 includes geolocation-related context-data tags similar to the context-data tags described supra in the description of FIG. 8. Context-data tag cloud 1006 includes User icons and/or place icons (e.g. digital photographs of entity represented or generic icons if no digital photograph available) of users associated with the user such as social-networking friends and/or users included in the mobile device's contact list. User icons can include the user's name and approximated distance from the user's last known geolocation. For example, friends' geolocation can be sent from the friends' mobile devices to the context-data server 304. In some embodiments, friends' geolocation information can be obtained from a third-party friend location social networking server. Physical proximity can also be indicated by distance of the icon from the center of the context-data tag cloud. In some embodiments, context-data tag cloud 1004 can also include virtual place icons (e.g. associated with a location in a virtual world) and avatar icons of friend's avatars in a virtual world. In some embodiments, context-data tag clouds can be related to each other. Such a relationship can be indicated by such methods as overlapping context-data tag clouds, arrows and the like. For example, arrow 1007 indicates that context-data tag cloud 1008 derives from the relationships depicted in context-data tag cloud 1006. Context-data tag cloud 1008 comprises several context-data tag clouds from multiple users. More particularly, context-data tag cloud 1008 depicts items selected by both the user, Tom, and the friends, Sue and Jane, depicted in context-data tag cloud 1006. The items can be for sale at the location, REI. The particular context-data tag clouds were created when Tom, Sue and Jane visited REI and utilized an application in their mobile devices to select desired items (e.g. with RFID tags). Context-data tags of context-data tag cloud 1008 can include visual cues such as typeface commonalities with friend's name in context-data tag cloud 1006 to indicate the association between users and items. In some embodiments, context-data tag clouds 1002-1008 can be updated as the geolocation of mobile device changes as a function of time. It should be noted that the context-data tag clouds provided in FIG. 10 are illustrative examples only.

Regarding FIGS. 11-12, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with some embodiments, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with some embodiments.

FIG. 11 illustrates a methodology of implementing a context-data tag cloud, according one embodiment. In operation 1100, a context data is acquired from a context-enriched message. For example, communication network(s) 300 can include a cellular network that forwards text messages and context data associated with the text messages to the context-data server 304. In operation 1102, a context-data tag that represents the context data is generated. For example, in some embodiments, context-data server 304 can parse the text message and determine a portion of the text message that represents the context data. In some embodiments, in addition to other methods described supra, a table of user-defined tags matched to particular context-data types can also be utilized to generate a context-data tag. In operation 1104, a context-data tag cloud comprising at least one context-data tag is rendered. For example, in some embodiments, context-data server 304 can encode the context-data tag in with a markup language utilized for a webpage interface. In some embodiments, the context-data tag cloud data can be communicated to a GUI of mobile device. The GUI can then render the context-data tag cloud for display.

FIG. 12 illustrates a methodology of implementing a context-data tag cloud, according another embodiment. In operation 1200, a context data is obtained from a mobile device. In operation 1202, a metadata term (e.g. a tag) is associated with the context data. In operation 1204, the metadata term is associated with a text that describes an attribute of the context data. In operation 1206, the text is incorporated into a webpage document. For example, the text can be encode with a markup language and communicated to the webpage server 308. In operation 1208, a tag cloud including at least one text that describes the attribute of the context data is generated. For example, tag cloud graphics file(s) can be generated by the context-server 304 and communicated to the webpage server 308. These graphics files can be utilized by a GUI of a mobile device operating system to render an image of the tag cloud. It should be noted that in some embodiments, the functionalities of the context-data server 304 and the webpage server 308 can be integrated into a single system. In operation 1210, a substantially current (i.e. assuming process and data transmission latency) is periodically obtained. For example, the context-data server 304 can periodically query a mobile device (e.g. mobile device 302 A) to obtain a new value a context data as measured by a sensor of the mobile device. In some embodiments, a virtual sensor of the mobile device can obtain a value of a virtual context data that describes an attribute of a virtual environment and/or a data environment, for example. The systems and functionalities of FIGS. 1-6 cat be utilized to perform operations 1200-1210.

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense.

What is claimed is:

1. A method comprising:
obtaining a first context data of a first environmental attribute of a user-facing digital camera of a user-worn computer goggles, wherein the first context data comprises a first digital image, and wherein the first context data comprises a first user state data as indicated by a first user-movement pattern, and wherein the first user-movement pattern is obtained by the user-facing digital camera of the user-worn computer goggles;
obtaining a second context data of a second environmental attribute of the user-facing digital camera of the user-worn computer goggles, wherein the second context data comprises a second digital image, and wherein the second context data comprises a second user state data as indicated by a second user-movement pattern, and wherein the second user-movement pattern is obtained by the user-facing digital camera of the user-worn computer goggles;

generating a tag cloud comprising a tint component that describes the first context data of the user-facing digital camera of the user-worn computer goggles and a second component that describes the second context data of the user-facing digital camera of the user-worn computer goggles;

modifying a display attribute of the first component according to the first context data as a function of time; and modifying a display attribute of the second component according to the second context data as a function of time.

2. The method of claim 1 further comprising:

rendering, with a server, the context-data tag cloud into a format accessible by a web browser.

3. The method of claim 1 further comprising:

associating a metadata term with the first context data, and wherein the metadata term comprises to text that describes an attribute of the context data.

4. The method of claim 3, wherein the metadata term comprises a pre-specified tag.

5. The method of claim 4, further comprising:

periodically obtaining a substantially current value of the first context data.

6. The method of claim 5 further comprising:

periodically revising the text to describe the substantially current value of the first context data.

7. The method of claim 6, further comprising:

providing a control element that allows a user to initiate a revision of the text to describe the substantially current value of the first context data.

8. The method of claim 1, wherein the first context data is obtained from a biosensor in the user-worn computer goggles.

9. The method of claim 8, wherein the first context data comprises a user attribute.

10. The method of claim 9, wherein the first context data attribute comprises a biometric data.

11. The method of claim 1, wherein the first context data is obtained from a user-worn sensor.

12. A method comprising:

obtaining a first context data of a first environmental attribute, wherein the first context data comprises a user-movement pattern that indicates a user state, wherein the user-movement pattern is obtained by a user-facing digital camera of a user-worn computer goggles;

obtaining a second context data of a second environmental attribute obtained by another sensor of the user-worn computer goggles;

generating an icon comprising a first component that describes the first context data and a second component that describes the second context data;

modifying a display attribute of the first component according to the first context data as a function of time of the user movement attribute; and modifying a display attribute of the second component according to the second context data as a function of time.

13. The method of claim 12, wherein the second context data comprises a user location data.

14. The method of claim 12, wherein the second context data is obtained from a biosensor.

15. The method of claim 12, wherein the icon comprises a graphical representation of the first context data and the second context data formatted for display with a web browser.

16. The method of claim 12, wherein the other sensor comprises another digital camera of the user-worn computer goggles.

17. A method comprising:

receiving a first context data obtained from a user-worn sensor, wherein the user-worn sensor comprises a user-facing digital camera that measures a user movement attribute, and wherein the user-facing digital camera is in a user-worn computer goggles, and wherein the first context data comprises a first user state data as indicated by a first user-movement pattern;

receiving a second context data obtained from a another sensor, wherein the second context data measures a user location;

creating a graphical representation of the first context data and the second context data; and modifying, the graphical representation according to a change of a value of the first context data as a function of time of the user movement attribute.

18. The method of claim 17 further comprising:

periodically communicating the graphical representation to a mobile device.

* * * * *